US007935431B2

(12) United States Patent
Poncin et al.

(10) Patent No.: US 7,935,431 B2
(45) Date of Patent: May 3, 2011

(54) CAST PARTS WITH ENHANCED WEAR RESISTANCE

(75) Inventors: Claude Poncin, Trooz (BE); Francesco Vescera, Vaux-Borset (BE)

(73) Assignee: Magotteaux International SA, Vaux-Sous-Chevremont (BE)

( * ) Notice: Subject to any disclaimer, the term of this patent is extended or adjusted under 35 U.S.C. 154(b) by 0 days.

(21) Appl. No.: 10/860,546

(22) Filed: Jun. 4, 2004

(65) Prior Publication Data

US 2005/0072545 A1 Apr. 7, 2005

Related U.S. Application Data

(63) Continuation of application No. PCT/BE02/00150, filed on Sep. 30, 2002.

(30) Foreign Application Priority Data

Dec. 4, 2001 (EP) .................................... 01870267

(51) Int. Cl.

*B32B 5/20* (2006.01)
*B32B 5/18* (2006.01)
*B32B 15/18* (2006.01)
*B32B 15/16* (2006.01)

(52) U.S. Cl. ........ 428/682; 428/545; 428/614; 428/627; 428/698; 428/457

(58) Field of Classification Search ........................ None
See application file for complete search history.

(56) References Cited

U.S. PATENT DOCUMENTS

| | | | |
|---|---|---|---|
| 3,181,939 A | 5/1965 | Marshall et al. | |
| 3,918,924 A * | 11/1975 | Shibata | 428/539.5 |
| 4,198,233 A * | 4/1980 | Frehn | 419/15 |
| 4,586,663 A | 5/1986 | Bartley | |
| 4,595,663 A | 6/1986 | Krohn et al. | |
| 4,718,941 A * | 1/1988 | Halverson et al. | 75/236 |
| 4,787,564 A | 11/1988 | Tucker | |

(Continued)

FOREIGN PATENT DOCUMENTS

DE 702385 2/1941

(Continued)

OTHER PUBLICATIONS

WO 9705951 English Machine Translation, Bruno et al, Feb. 1997.*

(Continued)

*Primary Examiner* — Jennifer C McNeil
*Assistant Examiner* — Jason L Savage
(74) *Attorney, Agent, or Firm* — Fitch, Even, Tabin & Flannery

(57) ABSTRACT

The invention concerns a cast wear part with its structure reinforced by at least a type metal carbide, and/or metal nitride, and/or boride, and/or metal oxides, and/or intermetallic compounds, referred to below as constituents. The invention is characterized in that the raw materials used as reagents for said constituents have been introduced in a mould (1) before casting in the form of compacted powder inserts or preforms (3) or the form of slurries (4), and the reaction of said powders has been activated in situ by casting a metal, forming a porous conglomerate in situ, and said metal has infiltrated the porous conglomerate, thus forming a reinforced structure leading to inclusion of said constituents in the structure of the metal used for casting, thereby creating a reinforcing structure on the wear part (2).

15 Claims, 4 Drawing Sheets

U.S. PATENT DOCUMENTS

| | | | | |
|---|---|---|---|---|
| 4,806,394 A * | 2/1989 | Steine | 427/451 |
| 4,940,188 A | 7/1990 | Rodriguez et al. | |
| 4,981,632 A * | 1/1991 | Claar et al. | 264/82 |
| 4,997,461 A | 3/1991 | Markhoff-Matheny et al. | |
| 5,052,464 A | 10/1991 | Natori | 164/80 |
| 5,184,784 A | 2/1993 | Rose et al. | |
| 5,194,237 A * | 3/1993 | Cliche et al. | 423/440 |
| 5,287,911 A | 2/1994 | Aghajanian et al. | |
| 5,435,234 A | 7/1995 | Bentz et al. | |
| 5,509,555 A * | 4/1996 | Chiang et al. | 216/56 |
| 5,549,151 A | 8/1996 | Yang | |
| 5,551,963 A | 9/1996 | Larmie | |
| 5,638,886 A | 6/1997 | Aghajanian et al. | |
| 5,855,701 A | 1/1999 | Bonnevie | |
| 5,989,489 A * | 11/1999 | Stuivinga et al. | 419/6 |
| 6,033,791 A | 3/2000 | Smith et al. | 428/627 |
| 6,203,897 B1 * | 3/2001 | Koizumi et al. | 428/336 |
| 6,221,184 B1 | 4/2001 | Bonnevie | |
| 6,447,852 B1 * | 9/2002 | Gordeev et al. | 427/577 |
| 6,517,427 B1 * | 2/2003 | Yoshikawa et al. | 451/547 |
| 6,588,692 B1 * | 7/2003 | Poncin | 241/301 |

FOREIGN PATENT DOCUMENTS

| | | |
|---|---|---|
| DE | 1949777 | 10/1970 |
| DE | 7326661 | 11/1973 |
| DE | 2335588 | 3/1975 |
| DE | 10121928 | 11/2002 |
| EP | 0476496 | 3/1992 |
| EP | 0575685 | 12/1993 |
| EP | 0838288 | 4/1998 |
| EP | 0841990 | 5/1998 |
| EP | 0930948 | 7/1999 |
| EP | 1530965 | 5/2005 |
| JP | 60127067 | 7/1985 |
| JP | 62214863 | 9/1987 |
| JP | 62286661 | 12/1987 |
| JP | 1289558 | 11/1989 |
| JP | 2187250 | 7/1990 |
| JP | 5200526 | 8/1993 |
| WO | WO 90/07013 | 6/1990 |
| WO | WO 90/11154 | 10/1990 |
| WO | WO 98/15373 | 4/1998 |
| WO | 98/31467 | 7/1998 |
| WO | 98/45486 | 10/1998 |
| WO | WO 99/47264 | 9/1999 |

OTHER PUBLICATIONS

"An Investigation of Metal Penetration in Steel Sand Cores", by S.L. Gertsman and A.E. Morton, (9 pgs.).
"Metal Penetration and Sand Adherence" in Journal of the Association, Dec. 1952, (8 pgs.).
"On the Interface Reactions of Chromite, Olivine and Quartz Sands With Molten Steel", by Paavo Asanti, Otaniemi, Finland, AFS Cast Metals Research Journal, vol. 4, 1968, (7 pgs.).
"The CO2-Silicate Process in Foundries", (group of 2) by K.E. L. Nicholas, British Cast Iron Research Assoc., Birmingham, England, 1972, (15 pgs.).
"AFS-Modern Casting New Technology Seminar on Sodium Silicate Binders", American Foundrymen's Society Tech Report; No. 7419, Sep. 1974, Speaker, K.E.L. Nicholas, Jun. 27, 1974, (21 pgs.).
"Space-Related Composite-Material Experiments", by S. Kaye, J. Vac. Sci. Technol., vol. 11, No. 6, Nov./Dec. 1974, (4 pgs.).
"Einfluβ Von Auf Die Oberflächenspannung Von Stahlschmelzen", by Osama M. Abd El-Wahab, el Giza (Var Ägypten), Helmut Burghardt and Hans-Joachim Eckstein, Neue Hütte, 20. Jg. Heft 7, Jul. 1975, (3 pgs.).
"Strengthening of Steel by the Method of Spraying Oxide Particles Into Molten Steel Stream", by Masayoshi Hasegawa and Kazuhiko Takeshita, 1978 American Society for Metals and the Metallurgical Society of Aime, vol. 9B, Sep. 1978-383, (6 pgs.).
Phenomenes Chimiques Interfaciaux Contribuant A L'Abreuvage En Fonderie De Fonte, by M. Onillon, J. Perrin, J. Rebaudieres and H. de Roulhac, Hommes Et Fonderie, Janvier, 1980, (5 pgs.).
Untersuchung Der Penetration Von Stahlschmeizen Aus G-X70 Cr29 Und G-X15 CrNiSi25 20 in Furanharzgebundene Formstoffe Auf Chromitsandbasis-Teil 2, by Karl Eugen Höner and Paul Werner Nogossek, Berlin, Giesserei-Forschung, vol. 35 Jahgang 1982, Heft 2, (11 pgs).
Untersuchung Der Penetration Von Stahlschmeizen Aus G-X70 Cr29 Und G-X15 CrNiSi25 20 in Furanharzgebundene Formstoffe Auf Chromitsandbasis-Teil 1, by Karl Eugen Höner and Paul Werner Nogossek, Berlin, Giesserei-Forschung, vol. 35 Jahgang 1982, Heft 2, (11 pgs).
"Cast-In-Place Hardfacing", by K.G. Davis and J.G. Magny, American Foundrymen's Society, Transactions, vol. 89, Cincinnati, OH, Apr. 27-May 1, 1981, published 1982, (17 pgs.).
"Compatibility Between Carbon Fibre and Binary Aluminium Alloys", by Yoshinobu Kimura, Yoshinao Mishima, Sokichi Umekawa and Tomoo Suzuki, Journal of Materials Science, vol. 19, 1984, (8 pgs.).
"2000 Advanced Ceramics Toughen Up Their Act", by Robert R. Irving, Iron Age, May 3, 1985, (5 pgs.).
"Application of Cast-On Ferrochrome-Based Hard Surfacings to Polystyrene Pattern Castings", by J.S. Hansen, R.R. Jordan, S.J. Gerdemann and G.F. Soltau, U.S. Bureau of Mines, Albany, OR, 1985, published by U.S. Dept. of Commerce National Technical Information Service, (27pgs.).
New Sprayable Ceramic Fiber With Special Binder Provides Economical System for Insulating Furances, by Jerry Barrows, Industrial Heating, Apr. 1985, (3 pgs.).
"High-Alloy White Irons", by R.B. Gundlach, ASM Handbook, vol. 15, Casting, 1988. (8 pgs.).
"Composites a Matrice Metallique: Des Supermetaux", L'Usine Nouvelle, Dec. 1987 (4 pgs.).
"Réalisation Par Moulage De Piéces Bimétalliques Pour Application âDes Problëmes De Corrosion Ou D'Abrasion", by P. Poyet, E. bollinger, F. Elsen, P. Guillermin and P. Guiraldenq, Hommes Et Fonderie, Apr. 1987 (7 pgs.).
"Modeling of Infiltration Kinetics for Liquid Metal Processing of Composites", by G.P. Martins, D.L. Olson and G.R. Edwards, Metallurgical Transactions B, vol. 19B, Feb. 1988-95, (6 pgs.).
"Cast Metal-Matrix Composites", by Pradeep Rohatgi, Metals HandbookCasting, 9th ed., vol. 15, ASM International, 1988, (15 pgs.).
"The Prospects for Advanced Polymer-Metal- and Ceramic-Matrix Composites", by Thomas Abraham, Richard W. Bryant and Peter J. Mooney, Journal of Metals, Nov. 1988, (5 pgs.).
"Advances in Cast Metal Composites", by Steven G. Fishman, Journal of Metals, Nov. 1988, (2 pgs.).
"Ceramic Composites Emerging as Advanced Structural Materials", by Ron Daganl, News Focus, Feb. 1, 1988, (6 pgs.).
"Introduction Sur Les Céramiques Techniques Modernes Propriétés-Stabilité* Premiére Partie", by P. Tassot, La Revue de Metallurgie-CIT, Janvier, 1988, (10 pgs.).
"Les Nouvelles Céramiques", Athena N' 55, Nov. 1989 (9 pgs.).
"Metal-Based Materials Strengthen Structures", Tom Shelley reports, Eureka Transfers Technology, No. 7, 1990, (3 pgs.).
"Mechanisms of Metal Penetration in Foundry Molds", by J.M. Svoboda, Ninety-Eighth Annual Meeting of the American Foundrymen's Society, May 1994, (8 pgs.).
"Semisolid Metal Casting and Forging", by Malachi P. Kenney, James A. Courtois, Robert D. Evans, Gilbert M. Farrior, Curtis P. Kyonka, Alan A. Koch, and Kenneth P. Young, Metals Handbook, 9th Edition, vol. 15, 1998, (13 pgs.).
Article entitled "Processes" and "Materials", New Products International, (2 pgs.).
Article entitled "Fused Zirconia-Aluminas", (1 pg.).
Publication entitled "Uni-Bond Silicates" (18 pgs.).
Publication entitled"Das Ende Der Eisenzeit", (13 pgs.).
Céramiques Renforcées Par De L'Oxyde De Zirconium Et Résistantes á L'Usure, by O. Toft Sorensen, (3 pgs.).
"The Interface Phase in Al-Mg/Al2O3 Composites", by A. Munitz, M. Metzger, and R. Mehrabian, 1979 American Society for Metals and the Metallurgical Society of Aime, vol. 10A, Oct. 1979-1491, (7 pgs).
"A Look Into the Future: Wider Application of the Sodium Silicate-Carbon Dioxide Process Through a Better Understanding of the Basic Principles and the New Technology", by J. Gotheridge, published in AFS Transactions, 1980, from the 83rd Annual Meeting; Birmingham, AL, Apr. 30-May 4, 1979, (37 pgs.).
"Marching Into the New Stone Age", by H. Garrett DeYoung, High Technology, Aug. 1985, (3 pgs.).
"ION Implantation in Metals and Ceramics", by C.J. McHargue, International Metals Reviews, 1986, vol. 31, No. 2, (26 pgs.).
"Chemically Bonded Cores & Molds, an Operator'S Manual for the Use of Chemically Bonded, Self-Setting Sand Mixtures", American Foundrymen's Society, Inc., 1987, (100 pgs.).
"Ceramics II", by James A. Spirakis, Advanced Materials & Processes Inc., Metal Progress, Mar. 1987 (4 pgs.).
"An Investigation of Metal Penetration in Steel Sand Cores", by S.L. Gertsman and A.E. Morton, (9 pgs.).
"Metal Penetration and Sand Adherence" in Journal of the Association, Dec. 1952, (8 pgs.).
"On the Interface Reactions of Chromite, Olivine and Quartz Sands With Molten Steel", by Paavo Asanti, Otaniemi, Finland, AFS Cast Metals Research Journal, vol. 4, 1968, (7 pgs.).
"The CO2-Silicate Process in Foundries", (group of 2) by K.E. L. Nicholas, British Cast Iron Research Assoc., Birmingham, England, 1972, (15 pgs.).
"AFS-Modern Casting New Technology Seminar on Sodium Silicate Binders", American Foundrymen's Society Tech Report; No. 7419, Sep. 1974, Speaker, K.E.L. Nicholas, Jun. 27, 1974, (21 pgs.).
"Space-Related Composite-Material Experiments", by S. Kaye, J. Vac. Sci. Technol., vol. 11, No. 6, Nov./Dec. 1974, (4 pgs.).
"Einfluβ Von Auf Die Oberflächenspannung Von Stahlschmelzen", by Osama M. Abd El-Wahab, el Giza (VAR Ägypten), Helmut Burghardt and Hans-Joachim Eckstein, Neue Hütte, 20. Jg. Heft 7, Jul. 1975, (3 pgs.).
"Strengthening of Steel by the Method of Spraying Oxide Particles Into Molten Steel Stream", by Masayoshi Hasegawa and Kazuhiko Takeshita, 1978 American Society for Metals and the Metallurgical Society of Aime, vol. 9B, Sep. 1978-383, (6 pgs.).
Phenomenes Chimiques Interfaciaux Contribuant a L'Abreuvage En Fonderie De Fonte, by M. Onillon, J. Perrin, J. Rebaudieres and H. de Roulhac, Hommes Et Fonderie, Janvier, 1980, (5 pgs.).
Untersuchung Der Penetration Von Stahlschmeizen Aus G-X70 Cr29 Und G-X15 CrNiSi25 20 in Furanharzgebundene Formstoffe Auf Chromitsandbasis-Teil 2, by Karl Eugen Höner and Paul Werner Nogossek, Berlin, Giesserei-Forschung, vol. 35 Jahgang 1982, Heft 2, (11 pgs).
Untersuchung Der Penetration Von Stahlschmeizen Aus G-X70 Cr29 Und G-X15 CrNiSi25 20 in Furanharzgebundene Formstoffe Auf Chromitsandbasis-Teil 1, by Karl Eugen Höner and Paul Werner Nogossek, Berlin, Giesserei-Forschung, vol. 35 Jahgang 1982, Heft 2, (11 pgs).
"Cast-In-Place Hardfacing", by K.G. Davis and J.G. Magny, American Foundrymen's Society, Transactions, vol. 89, Cincinnati, OH, Apr. 27-May 1, 1981, published 1982, (17 pgs.).
"Compatibility Between Carbon Fibre and Binary Aluminium Alloys", by Yoshinobu Kimura, Yoshinao Mishima, Sokichi Umekawa and Tomoo Suzuki, Journal of Materials Science, vol. 19, 1984, (8 pgs.).
"2000 Advanced Ceramics Toughen Up Their Act", by Robert R. Irving, Iron Age, May 3, 1985, (5 pgs.).
"Application of Cast-On Ferrochrome-Based Hard Surfacings to Polystyrene Pattern Castings", by J.S. Hansen, R.R. Jordan, S.J. Gerdemann and G.F. Soltau, U.S. Bureau of Mines, Albany, OR, 1985, published by U.S. Dept. of Commerce National Technical Information Service, (27pgs.).
"New Sprayable Ceramic Fiber With Special Binder Provides Economical System for Insulating Furances", by Jerry Barrows, Industrial Heating, Apr. 1985, (3 pgs.).
"High-Alloy White Irons", by R.B. Gundlach, ASM Handbook, vol. 15, Casting, 1988. (8 pgs.).
"Composites a Matrice Metallique: Des Supermetaux", L'Usine Nouvelle, Dec. 1987 (4 pgs.).
"Réalisation Par Moulage De Piéces Bimétalliques Pour Application âDes Problémes De Corrosion Ou D'Abrasion", by P. Poyet, E. bollinger, F. Elsen, P. Guillermin and P. Guiraldenq, Hommes Et Fonderie, Apr. 1987 (7 pgs.).
"Modeling of Infiltration Kinetics for Liquid Metal Processing of Composites", by G.P. Martins, D.L. Olson and G.R. Edwards, Metallurgical Transactions B, vol. 19B, Feb. 1988-95, (6 pgs.).
"Cast Metal-Matrix Composites", by Pradeep Rohatgi, Metals HandbookCasting, 9th ed., vol. 15, ASM International, 1988, (15 pgs.).
"The Prospects for Advanced Polymer-Metal- and Ceramic-Matrix Composites", by Thomas Abraham, Richard W. Bryant and Peter J. Mooney, Journal of Metals, Nov. 1988, (5 pgs.).
"Advances in Cast Metal Composites", by Steven G. Fishman, Journal of Metals, Nov. 1988, (2 pgs.).
"Ceramic Composites Emerging As Advanced Structural Materials", by Ron Daganl, News Focus, Feb. 1, 1988, (6 pgs.).
"Introduction Sur Les Céramiques Techniques Modernes Propriétés-Stabilité* Premiére Partie", by P. Tassot, La Revue de Metallurgie-CIT, Jan.1988, (10 pgs.).
"Les Nouvelles Céramiques", Athena N' 55, Nov. 1989 (9 pgs.).
"Metal-Based Materials Strengthen Structures", Tom Shelley reports, Eureka Transfers Technology, No. 7, 1990, (3 pgs.).
"Mechanisms of Metal Penetration in Foundry Molds", by J.M. Svoboda, Ninety-Eighth Annual Meeting of the American Foundrymen's Society, May 1994, (8 pgs.).
"Semisolid Metal Casting and Forging", by Malachi P. Kenney, James A. Courtois, Robert D. Evans, Gilbert M. Farrior, Curtis P. Kyonka, Alan A. Koch, and Kenneth P. Young, Metals Handbook, 9th Edition, vol. 15, 1998, (13 pgs.).
Article entitled "Processes" and "Materials", New Products International, (2 pgs.), Mar. 1986.
Céramiques Renforcées Par De L'Oxyde De Zirconium Et Résistantes âL'Usure, by O. Toft Sorensen, (3 pgs.).
"The Interface Phase in Al-Mg/Al2O3 Composites", by A. Munitz, M. Metzger, and R. Mehrabian, 1979 American Society for Metals and the Metallurgical Society of Aime, vol. 10A, Oct. 1979-1491, (7 pgs.).
"A Look Into the Future: Wider Application of the Sodium Silicate-Carbon Dioxide Process Through a Better Understanding of the Basic Principles and the New Technology", by J. Gotheridge, published in AFS Transactions, 1980, from the 83rd Annual Meeting; Birmingham, AL, May 30-May 4, 1979, (37 pgs.).
"Marching Into the New Stone Age", by H. Garrett DeYoung, High Technology, Aug. 1985, (3 pgs.).
"ION Implantation in Metals and Ceramics", by C.J. McHargue, International Metals Reviews, 1986, vol. 31, No. 2, (26 pgs.).
"Chemically Bonded Cores & Molds, an Operator'S Manual for the Use of Chemically Bonded, Self-Setting Sand Mixtures", American Foundrymen's Society, Inc., 1987, (100 pgs.).
"Ceramics II", by James A. Spirakis, Advanced Materials & Processes Inc., Metal Progress, Mar. 1987, (4 pgs.).

* cited by examiner

CAST PARTS WITH ENHANCED WEAR RESISTANCE

RELATED APPLICATION

This is a continuation of PCT/BE02/00150 filed Sep. 30, 2002, designating the United States and claiming priority to European Patent Application No. 01870267.0, filed Dec. 4, 2001.

FIELD OF THE INVENTION

The present invention relates to the production of cast parts with enhanced wear resistance by an improvement in the resistance to abrasion whilst retaining acceptable resistance to impact in the reinforced areas.

TECHNOLOGICAL BACKGROUND AT THE BASIS OF THE INVENTION

Installations for extracting and breaking up minerals, and in particular crushing and grinding material, are subjected to numerous constraints of performance and costs.

As an example, one might cite in the area of the treatment of aggregates, of cement and of minerals, wear parts such as ejectors and anvils of grinding machines with vertical shafts, hammers and breakers of grinding machines with horizontal shafts, cones for crushers, tables and rollers for vertical crushers, armoured plating and elevators for ball mills or rod mills. With regard to mining extraction installations, one might mention, among others, pumps for bituminous sands or drilling machines, pumps for mines and dredging teeth.

The suppliers of wear parts for these machines are faced with increased demands for wear parts which meet the constraints of resistance to impact and resistance to abrasion at the same time.

Traditional materials generally meet one or the other of these types of requirement but are very rarely resistant to both impact and abrasion. Indeed, ductile materials offer enhanced resistance to impact but have very little resistance to abrasion. On the other hand, hard abrasion-resistant materials have very little resistance to violent impact.

Historically, the first reflections on this problem led to an exclusively metallurgical approach which consisted in suggesting steels with manganese that are very resistant to impacts and nevertheless achieve intermediate hardness levels of the order of 650 to 700 Hv (Vickers hardness).

Other alternatives such as castings with chrome have also been suggested. These allow to achieve hardness levels of the order of 700 to 850 Hv after suitable thermal treatment. These values are achieved for alloys containing a percentage of carbide up to 35%.

Currently, bimetallic castings have also been used, but these nevertheless have the disadvantage of being limited to parts of simple shape, which drastically reduces their opportunities for industrial application.

Wear parts are generally considered as consumables, which means that apart from purely technical constraints, there is also a financial constraint which limits the opportunities for solutions that have an average cost of US$4/Kg. It is generally estimated that this price level, which is twice as high as that of traditional wear parts, is the threshold of financial acceptability for customers.

DESCRIPTION OF THE SOLUTIONS ACCORDING TO STATE OF THE ART

Achieving a wear part that is resistant to abrasion and impact has already been the subject of studies of various types.

In this context, one has naturally turned to composite parts based on ceramics and, in this area, the Applicant already discloses in document WO 99/47264 an alloy based on iron and ceramics which is very resistant to wear and impact.

In document WO 98/15373, the Applicant proposes to insert into a mould, before casting, a wafer of porous ceramic which is infiltrated by the metal during casting. The opportunities for application of this invention are nevertheless limited to parts of strong cross-section and to alloys with high fluidity in casting. Moreover, the positioning of these ceramic wafers is rather conditioned by the requirements of infiltration by the cast metal than by the actual requirements of the part's use.

Without aiming at the same objectives, Merzhanov discloses in document WO/9007013 a fireproof porous material obtained by cold compression of the raw material, of an exothermic mixture of powders under vacuum, followed by starting the combustion of the mixture. Here, we are dealing with a chain reaction. With this method, he obtains extremely hard materials but without any resistance to impact. This is essentially due to the high porosity of the products.

Moreover, in document WO/9011154, the same inventor proposes a similar method where, in this case, the mixture of powders, after having reacted, is subjected to pressures as high as 1000 bars. This invention results in the production of layers that are extremely resistant to abrasion but with insufficient resistance to impact. The aim here is above all to produce surfaces for abrasive tools that are greatly solicited in this sense.

In general, the use of very pure powders such as titanium, boron, tungsten, aluminium, nickel, molybdenum, silicon, carbon, etc. powders results in extremely porous pieces after the reaction with porosity rates close to 50%. These therefore require compression after the reaction involving compaction and thus an increase in density, which is indispensable for industrial use.

The implementation complexity of such a method, the control of the reactions and the cost of the raw materials nevertheless considerably limit the introduction of these technologies into industry.

German patent application 1949777—Lehmann discloses a production method for cast parts that are highly wear resistant. In this method, carbide powders are combined with combustible binding agents and/or metallic powders with a low melting point. During casting, the binding agent gives up its place to the casting metal which then surrounds the carbide particles. In this method, there is no chemical chain reaction and all the particles highly wear resistant are present in the mould from the start.

Numerous documents disclose such a method for surrounding hard particles, and in particular U.S. Pat. Nos. 5,052,464 and 6,033,791—Smith, which are based on the presence of hard particles before casting which is to infiltrate the pores between the ceramic particles.

The invention avoids the pitfalls of the state of the art by producing wear parts of original structure and produced by an original and simple method, which is thus inexpensive.

AIMS OF THE INVENTION

The present invention aims to provide wear parts resistant both to abrasion and to impact at a financially acceptable price as well as a method for their production. It aims in particular to solve the problems associated with the solutions according to the state of the art.

SUMMARY OF THE INVENTION

The present invention relates to a cast wear part, with a structure reinforced by at least one type of metallic carbide, and/or metallic nitrides, and/or metallic oxides, and/or metallic borides, as well as intermetallic compounds, hereafter called the components, characterised in that the raw materials acting as reagents for said components have been put into a mould, before casting, in the form of inserts or pre-shaped compacted powders or in the form of barbitones, in that the reaction of said powders is triggered in situ by the casting of a metal forming a porous conglomerate in situ, and in that said metal infiltrates the porous conglomerate, thus forming a reinforced structure, so as to achieve the inclusion of said conglomerate in the structure of the metal used for the casting of the part, and thereby to create a reinforcing structure in the wear part.

One of the key aspects of the present invention shows that the porous conglomerate, created in situ and later infiltrated by the molten metal has a Vickers hardness of over 1000 $Hv_{20}$, the wear part thus obtained providing an impact resistance higher than that of the considered pure ceramics and at least equal to 10 $MPa\sqrt{m}$.

According to one of the features of the invention, the reaction in situ between the raw materials, i.e. the reagents for said components, is a chain reaction and it is triggered by the heat of the molten metal by forming a very porous conglomerate capable of being simultaneously infiltrated by the molten metal without significant alteration of the reinforcing structure.

According to one particularly advantageous embodiment of the invention, the reaction between the raw materials takes place at atmospheric pressure and without any particular protective gaseous atmosphere and without the need for compression after the reaction.

The raw materials intended to produce the component belong to the group of ferrous alloys, preferably of FerroTi, FerroCr, FerroNb, FerroW, FerroMo, FerroB, FerroSi, FerroZr or FerroV, or belong to the group of oxides, preferably $TiO_2$, FeO, $Fe_2O_3$, $SiO_2$, $ZrO_2$, $CrO_3$, $Cr_2O_3$, $B_2O_3$, $MoO_3$, $V_2O_5$, CuO, MgO and NiO or even to the group of metals or their alloys, preferably iron, nickel, titanium or aluminium and also carbon, boron or nitride compounds.

DETAILED DESCRIPTION OF THE INVENTION

The present invention proposes cast parts whose wear surfaces are reinforced by putting in the mould, before casting, materials comprising powders that are able to react in situ and under the sole action of the heat of the casting.

To this end, reagents in compacted powders are used and placed in the mould in the form of wafers or inserts 3 in the required shape, or alternatively in the form of a coating 4 covering the mould 1 where the part 2 is to be reinforced.

The materials that can react in situ produce hard compounds of carbides, borides, oxides, nitrides or intermetallic compounds. These, once formed, combine with any possible carbides already present in the casting alloy so as to further increase the proportion of hard particles with a hardness of Hv>1300 that contribute to the wear resistance. The latter are "infiltrated" at about 1500° C. by the molten metal and form an addition of particles resistant to abrasion incorporated into the structure of the metal used for the casting (FIG. 6).

Moreover, in contrast to the methods of the state of the art, it is not necessary to use pure metallic powders to obtain this reaction in situ. The method proposed advantageously allows to use inexpensive ferrous alloys or oxides in order to obtain extremely hard particles embedded in the matrix formed by the casting metal where reinforcement of the wear resistance is required.

Figure 6:
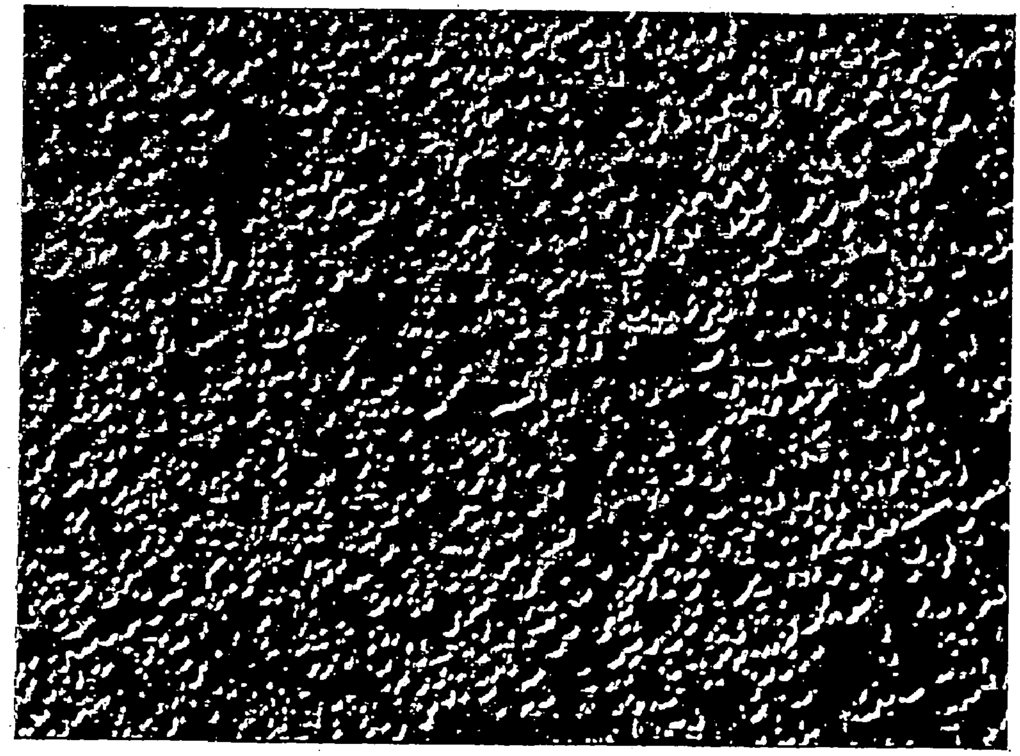
FIG. 6 shows particles of TiC in an iron alloy, resulting from a reaction in situ of FeTi with carbon to produce TiC in an iron-based matrix. The size of the TiC particles is of the order of a few microns.

Not only does the invention require no subsequent compaction, that is compression, of the areas with reinforced structure, but it benefits from the porosity thus created in said areas to allow the infiltration of the molten metal into the gaps at high temperature (FIG. 6).

This requires no particular protective atmosphere and takes place at atmospheric pressure with the heat provided by casting, which clearly has a particularly positive consequence on the cost of the method. A structure with very favourable features in terms of the simultaneous resistance to impact and abrasion is thus obtained.

The hardness values achieved by the particles thus embedded into the reinforced surfaces are in the range of 1300 to 3000 Hv. Following the infiltration by the casting metal, the compound obtained has a hardness higher than 1000 $Hv_{20}$ whilst retaining an impact resistance higher than 10 $MPa\sqrt{m}$. The impact resistance is measured by indentation, which means that a dent is made by means of a diamond piercing tool of pyramidal shape at a calibrated load.

Figure 1:
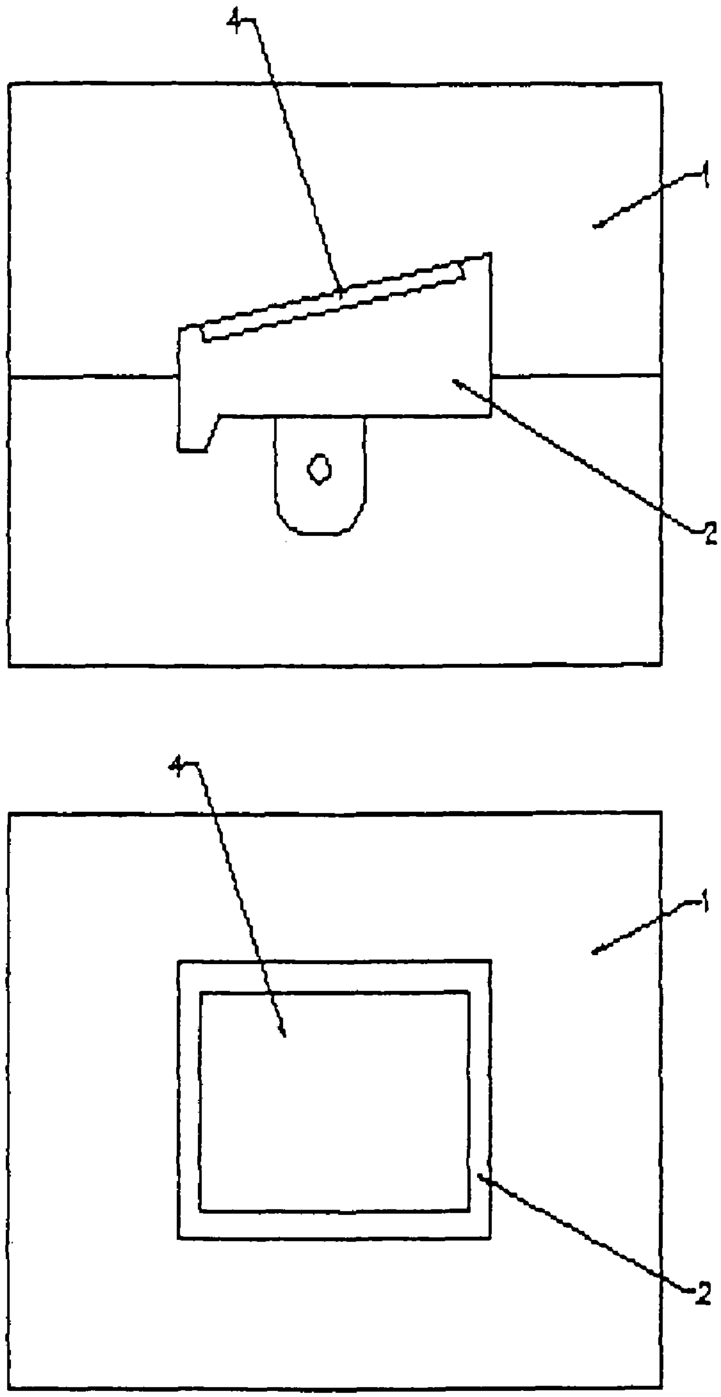
FIG. 1 shows a barbitone 1 spread over the areas where the cast part 2 in the mould 1 is to be reinforced.
Figure 2:
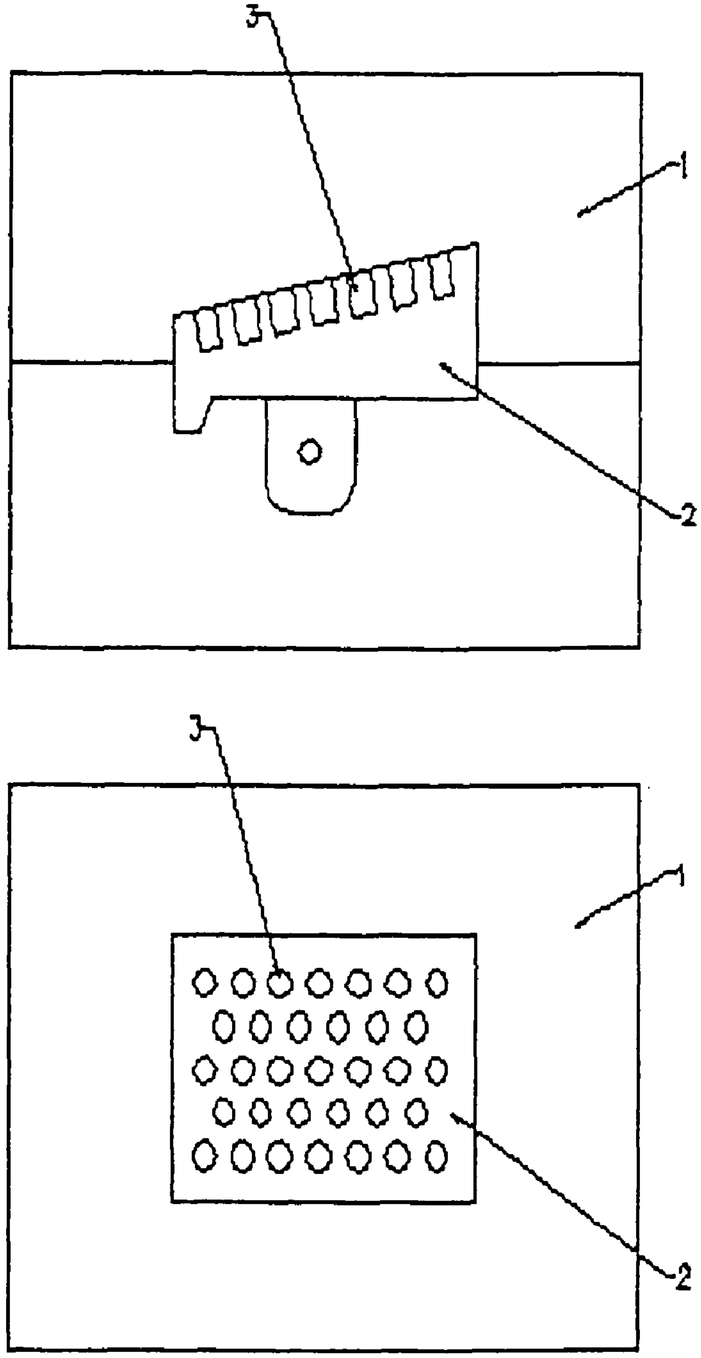
FIG. 2 shows the invention in the form of reinforcing inserts 3 in the part to be cast 2 in the mould
Figure 3:
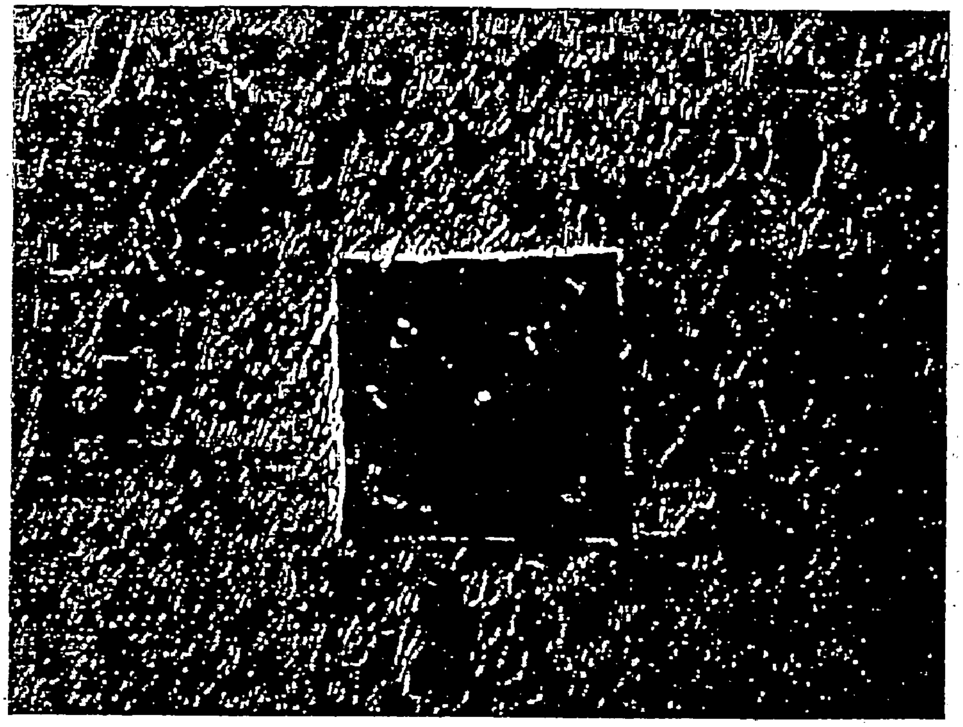
FIGS. 3, 4 and 5 show hardness impressions for a casting with chrome (FIG. 3), a pure ceramic (FIG. 4) and an alloy (FIG. 5) reinforced with ceramic as in the present invention.
Figure 4:
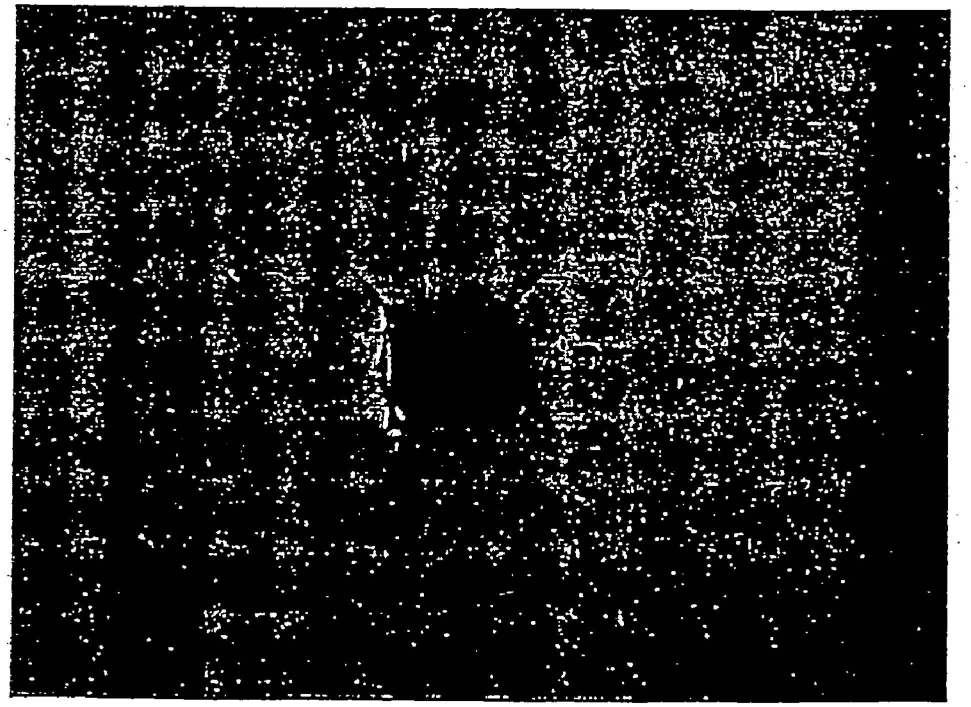
Figure 5:
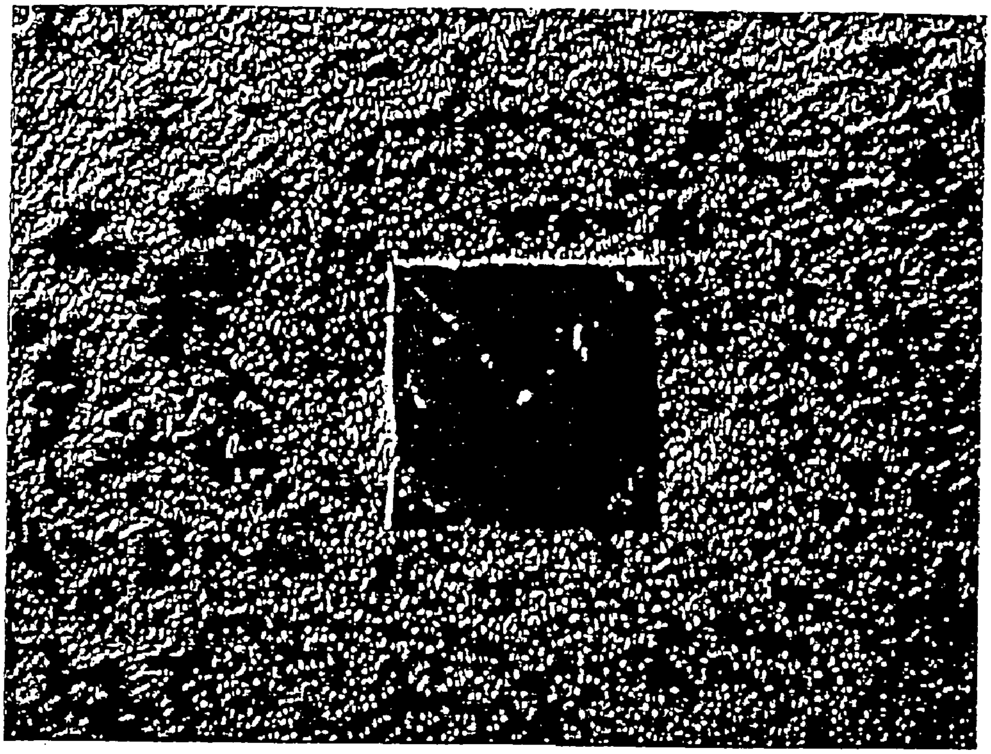

As a result of the load, the material is bent and may develop cracks at the corners of the dent. The length measurement of the cracks allows the impact resistance to be calculated (FIGS. 3, 4 and 5).

The raw materials intended to produce the component belong to the group of ferrous alloys, preferably of FerroTi, FerroCr, FerroNb, FerroW, FerroMo, FerroB, FerroSi, FerroZr or FerroV, or they belong to the group of oxides, preferably $TiO_2$, FeO, $Fe_2O_3$, $SiO_2$, $ZrO_2$, $CrO_3$ $Cr_2O_3$, $B_2O_3$, $MoO_3$, $V_2O_5$, CuO, MgO and NiO or to the group of metals or their alloys, preferably iron, nickel, titanium or aluminium and also carbon, boron or nitride compounds.

By way of an example, the reactions used in the present invention are generally of the type:

$FeTi+C \rightarrow TiC+Fe$ $TiO_2+Al+C \rightarrow TiC+Al_2O_3$ $Fe_2O_3+Al \rightarrow Al_2O_3+Fe$ $Ti+C \rightarrow TiC$ $Al+C+B_2O_3 \rightarrow B_4C+Al_2O_3$ $MoO_3+Al+Si \rightarrow MoSi_2+Al_2O_3$ These reactions may also be combined.

The reaction speed may also be controlled by the addition of different metals, alloys or particles which do not take part in the reaction. These additions may moreover advantageously be used in order to modify the impact resistance or other properties of the composite created in situ according to requirements. This is shown by the following illustrative reactions:

$Fe_2O_3+2Al+xAl_2O_3 \rightarrow (1+x)\ Al_2O_3+2Fe$

Ti+C+Ni->TiC+Ni

DESCRIPTION OF A PREFERRED EMBODIMENT OF THE INVENTION

The first preferred embodiment of the invention consists in compacting the chosen reactive powders by simple cold pressure. This takes place in a compression mould bearing the desired shape of the insert or the preformed shape 3, possibly in the presence of a binding agent, for the reinforcement of the cast part 2. This insert or preformed shape will then be placed into the casting mould 1 in the desired place.

For the powders, a particle size distribution is chosen with a D50 between 1 and 1000 microns, preferably lower than 100μ. Practical experience has shown that this particle size was the ideal compromise between the handling of the raw materials, the ability of the porous product to be infiltrated and the control of the reaction.

During casting, the hot metal triggers the reaction of the preformed shape or of the insert which transforms into a conglomerate with a porous structure of hard particles. This conglomerate, still at high temperature, is itself infiltrated and embedded in the casting metal making up the part. This step is carried out between 1400 and 1700° C. depending on the casting temperature of the alloy chosen to make the part.

A second preferred embodiment is the use of a barbitone (paste) 4 containing the various reagents so as to coat certain areas of the mould 1 or of the cores. The application of one or more layers is possible depending on the thickness desired. These different layers are then allowed to dry before the metal is poured into the mould 1. This molten metal also serves to trigger the reaction in order to create a porous layer which is infiltrated immediately after its reaction to form a structure that is particularly resistant both to impact and wear.

The invention claimed is:

1. A cast metal wear part comprising at least two portions, the portions including a cast iron portion comprising iron which has been cast and a reinforced structure portion which include cast iron infused into a conglomerate structure, the cast iron portion forming a portion of the cast metal wear part which is without the conglomerate structure, the conglomerate structure comprising agglomerated particles comprising titanium carbide, the conglomerate structure having pores with cast iron in the pores, the conglomerate structure formed by a chemical in situ reaction between two or more powdered raw materials which have been formed into a shape and are in a metal casting mold, the powdered raw materials being selected from the group consisting of FerroTi, carbon, carbon compounds, titanium, $TiO_2$, FeTi, titanium alloys and mixtures thereof, the chemical in situ reaction of the powdered raw materials being triggered and sustained by the heat of molten iron which is cast in the mold with the raw materials and which molten iron infiltrates the conglomerate structure formed by the chemical in situ reaction and resulting in inclusion of cast iron in the conglomerate structure and the formation of the reinforced structure portion in the cast metal wear part at atmospheric pressure without compacting pressure on the powdered raw material during the in situ reaction, each of the two or more powdered raw materials of a type and an amount which is effective for providing the in situ chemical reaction which provides the titanium carbide particles of the conglomerate structure, the conglomerate structure portion infused with the cast iron and cast iron portion during casting, the reinforced structure portion forming an abrasion resistant impact resistant area in the cast metal wear part.

2. The cast metal wear part of claim 1, wherein the chemical in situ reaction of the raw materials takes place at atmospheric pressure without requiring any compression after reaction of the powders.

3. The cast metal wear part of claim 2, wherein the reaction of the raw materials does not require any gaseous protective atmosphere.

4. The cast metal wear part of claim 1, wherein said reinforced structure on the wear part has an impact resistance of over 10MPa√m.

5. The cast metal wear part of claim 1 wherein the conglomerate structure with the cast metal therein has a Vickers hardness higher than 1000 $Hv_{20}$.

6. The cast metal wear part of claim 5 wherein the particles of conglomerate have a Vickers hardness between 1300 and 3000 Hv.

7. A cast metal wear part comprising at least two portions, the portions including a cast iron portion and a reinforced structure portion infused with cast iron, the reinforced structure portion comprising a conglomerate structure of particles of titanium carbide which are agglomerated with each other, the conglomerate structure having pores with the cast iron infused into the pores, the conglomerate structure portion having a Vickers hardness higher than 1000 $Hv_{20}$, the reinforced structure portion forming an abrasion resistant and impact resistant area, the cast iron portion being without the conglomerate structure, and the cast iron in both portions forming a cast iron matrix for the cast metal wear part.

8. The cast metal wear part of claim 7, wherein the particles of the conglomerate have a Vickers hardness between 1300 and 3000 Hv.

9. The cast metal wear part of claim 7 wherein the conglomerate structure of agglomerated particles consists essentially of titanium carbide.

10. A cast metal wear part comprising at least two portions, the portions including a cast iron portion and a reinforced structure portion, the reinforced structure portion including a titanium carbide conglomerate consisting essentially of titanium carbide, the cast iron portion forming a portion of the cast iron wear part which is without the titanium carbide conglomerate, the titanium carbide conglomerate having pores infused with cast iron in the pores, the titanium carbide conglomerate formed by a chemical in situ reaction between two or more powdered raw materials which have been formed into a shape and are in a metal casting mold, the powdered raw materials selected from the group consisting of FerroTi, carbon, carbon compounds, titanium, $TiO_2$, FeTi, titanium, titanium alloys and mixtures thereof, the chemical in situ reaction of the powdered raw materials being triggered and sustained by the heat of a molten iron which is cast in the mold with the raw materials, and which molten iron infiltrates the pores of the titanium carbide conglomerate formed by the chemical in situ reaction and resulting in inclusion of the cast iron in the titanium carbide conglomerate and the formation of the reinforced structure portion in the cast metal wear part during the in situ reaction, each of the two or more powdered raw materials of a type and an amount which is effective for providing the in situ chemical reaction which provides titanium carbide particles which form the titanium carbide conglomerate, the titanium carbide conglomerate forming a part of the cast of the cast metal wear part during casting, the reinforced structure portion forming an abrasion resistant impact resistant area of the cast metal wear part.

11. The cast metal wear part of claim 10 wherein the titanium carbide conglomerate with the cast iron therein has a Vickers hardness higher than 1000 $Hv_{20}$.

12. The cast metal wear part of claim 11, wherein the titanium carbide conglomerate has a Vickers hardness between 1300 and 3000 Hv.

13. A cast metal wear part comprising a cast iron matrix having at least two portions, a cast iron portion comprising iron which is cast and a reinforced structure portion which includes cast iron infused into a conglomerate structure, the cast iron portion being without a conglomerate structure, the conglomerate structure comprising a conglomerate of titanium carbide, the conglomerate of titanium carbide having pores with cast iron infused into the pores.

14. The cast metal wear part of claim 13, wherein the conglomerate structure is formed by a chemical in situ reaction between two or more powdered raw materials which have been formed into a shape and are in a metal casting mold, the powdered raw materials being selected from the group consisting of FerroTi, carbon, carbon compounds, titanium, $TiO_2$, FeTi, titanium alloys and mixtures thereof, and the chemical in situ reaction of the powdered raw materials being triggered and sustained by the heat of molten iron and which molten iron is cast in the mold with the raw materials and which infiltrates pores in the conglomerate structure formed at the time of casting the iron in the mold by the chemical in situ reaction, the casting and reaction resulting in inclusion of cast iron in the conglomerate structure, the formation of the reinforced structure portion in the cast metal wear part at atmospheric pressure without compacting pressure on the powdered raw material during the in situ reaction and the reinforced structure portion forming an abrasion resistant impact resistant area in the cast metal wear part.

15. A cast metal wear part comprising a cast iron portion and a reinforced insert portion, the cast metal portion comprising iron which has been cast and the reinforced insert portion including cast iron infused into a conglomerate structure, the cast iron portion forming a portion of the cast metal wear part which is without the conglomerate structure, the conglomerate structure comprising agglomerated particles comprising titanium carbide, the conglomerate structure having pores with cast iron in the pores, the conglomerate structure formed by a chemical in situ reaction between two or more powdered raw materials which have been formed into a shaped insert and are in a metal casting mold, the powdered raw materials being selected from the group consisting of FerroTi, carbon, carbon compounds, titanium, $TiO_2$, FeTi, titanium alloys and mixtures thereof, the chemical in situ reaction of the powdered raw materials being triggered and sustained by the heat of molten iron which is cast in the mold with the raw materials and which molten iron infiltrates the conglomerate structure formed by the chemical in situ reaction and resulting in inclusion of cast iron in the conglomerate structure and the formation of the reinforced insert portion in the cast metal wear part at atmospheric pressure without compacting pressure on the powdered raw material during the in situ reaction, each of the two or more powdered raw materials of a type and an amount which is effective for providing the in situ chemical reaction which provides the titanium carbide particles of the conglomerate structure, the reinforced insert portion infused with the cast iron and cast iron portion during casting, the reinforced insert portion forming an abrasion resistant impact resistant area in the cast metal wear part.

* * * * *